United States Patent
Abdukalykov et al.

(10) Patent No.: US 8,972,883 B2
(45) Date of Patent: Mar. 3, 2015

(54) METHOD AND DEVICE FOR DISPLAY TIME AND TIMESCALE RESET

(71) Applicant: SAP AG, Walldorf (DE)

(72) Inventors: Rolan Abdukalykov, Montreal (CA); Alain Gauthier, Montreal (CA); Mohannad El-Jayousi, L'lle-Bizard (CA); Roy Ghorayeb, Montreal (CA); Vincent Lavoie, Montreal (CA); Xuebo Liang, Brossard (CA)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 13/655,927

(22) Filed: Oct. 19, 2012

(65) Prior Publication Data

US 2014/0115518 A1    Apr. 24, 2014

(51) Int. Cl.
G06F 3/048    (2013.01)

(52) U.S. Cl.
CPC ............................ G06F 3/048 (2013.01)
USPC ........................... 715/772; 715/733

(58) Field of Classification Search
None
See application file for complete search history.

(56) References Cited

U.S. PATENT DOCUMENTS

| | | | |
|---|---|---|---|
| 5,745,110 A | 4/1998 | Ertemalp | |
| 5,867,163 A * | 2/1999 | Kurtenbach | 715/840 |
| 6,201,554 B1 | 3/2001 | Lands | |
| 6,380,953 B1 | 4/2002 | Mizuno | |
| 6,674,450 B1 | 1/2004 | Toub et al. | |
| 6,915,490 B1 | 7/2005 | Ewing | |
| 7,050,056 B2 | 5/2006 | Meyringer | |
| 7,168,045 B2 | 1/2007 | Fliess et al. | |
| 7,340,484 B2 | 3/2008 | S et al. | |
| 7,421,645 B2 | 9/2008 | Reynar | |
| 7,603,381 B2 | 10/2009 | Burke et al. | |
| 7,739,695 B2 | 6/2010 | Wood et al. | |
| 7,908,584 B2 | 3/2011 | Singh et al. | |
| 8,024,666 B2 | 9/2011 | Thompson | |
| 8,191,003 B2 | 5/2012 | Brown et al. | |
| 8,402,480 B2 | 3/2013 | Rohwer | |

(Continued)

FOREIGN PATENT DOCUMENTS

| | | |
|---|---|---|
| AU | 2011101579 A4 | 2/2012 |
| EP | 1696301 A1 | 8/2006 |

(Continued)

OTHER PUBLICATIONS

Anonymous: "Google Calendar—Revision as of 16:55, Apr. 17, 2012," pp. 1-7, Gustavus Adolphus College, retrieved from the Internet: URL:https://gustavus.edu/gts/w/index.php?title=Google_Calendar&oldid=24920 [retrieved on Jan. 10, 2014].

(Continued)

*Primary Examiner* — Matt Kim
*Assistant Examiner* — Tuan S Nguyen
(74) *Attorney, Agent, or Firm* — Kenyon & Kenyon LLP

(57) ABSTRACT

A portable electronic device including a calendar application operable to display a calendar application at a first time and first timescale as well as a second time and second timescale different from the first time and first timescale, a memory operable to store a sequence of user inputs associated with a first time and first timescale, and an input unit operable to detect the sequence of user inputs, wherein the calendar application returns from the second time and second timescale to the first time and first timescale upon detection of the sequence of user inputs.

19 Claims, 4 Drawing Sheets

(56) References Cited

U.S. PATENT DOCUMENTS

| | | |
|---|---|---|
| 8,788,303 B1 | 7/2014 | Krone et al. |
| 8,812,546 B1* | 8/2014 | Cornali .................. 707/779 |
| 2002/0091586 A1 | 7/2002 | Wakai et al. |
| 2003/0066032 A1 | 4/2003 | Ramachandran et al. |
| 2003/0120621 A1 | 6/2003 | McDaniel et al. |
| 2003/0182210 A1 | 9/2003 | Weitzman et al. |
| 2004/0252134 A1 | 12/2004 | Bhatt et al. |
| 2005/0144038 A1 | 6/2005 | Tamblyn et al. |
| 2005/0171410 A1 | 8/2005 | Hjelt et al. |
| 2005/0278217 A1 | 12/2005 | Adams et al. |
| 2005/0289202 A1 | 12/2005 | S et al. |
| 2006/0069666 A1 | 3/2006 | Burke et al. |
| 2006/0089877 A1 | 4/2006 | Graziano et al. |
| 2006/0206522 A1 | 9/2006 | Austin et al. |
| 2006/0238538 A1 | 10/2006 | Kapler et al. |
| 2007/0064022 A1 | 3/2007 | Silverbrook et al. |
| 2007/0156430 A1 | 7/2007 | Kaetker et al. |
| 2007/0199006 A1 | 8/2007 | Mukundan et al. |
| 2007/0211056 A1 | 9/2007 | Chakraborty et al. |
| 2007/0233539 A1 | 10/2007 | Suenderhauf et al. |
| 2007/0244875 A1* | 10/2007 | Bodin et al. .................. 707/4 |
| 2007/0268246 A1 | 11/2007 | Hyatt |
| 2007/0288283 A1 | 12/2007 | Fitzpatrick |
| 2008/0040684 A1 | 2/2008 | Crump |
| 2008/0120129 A1 | 5/2008 | Seubert et al. |
| 2008/0163125 A1 | 7/2008 | Gu et al. |
| 2008/0178101 A1 | 7/2008 | Rode et al. |
| 2008/0178500 A1 | 7/2008 | Teuteberg |
| 2008/0195969 A1 | 8/2008 | Brown et al. |
| 2008/0221946 A1 | 9/2008 | Balon |
| 2008/0294994 A1* | 11/2008 | Kruger et al. .................. 715/733 |
| 2008/0307323 A1 | 12/2008 | Coffman et al. |
| 2008/0313005 A1 | 12/2008 | Nessland et al. |
| 2008/0319818 A1 | 12/2008 | Gurdin et al. |
| 2008/0320558 A1 | 12/2008 | Imanishi et al. |
| 2009/0076878 A1 | 3/2009 | Woerner et al. |
| 2009/0158173 A1 | 6/2009 | Palahnuk et al. |
| 2009/0174680 A1 | 7/2009 | Anzures et al. |
| 2009/0254597 A1* | 10/2009 | Karoji .................. 708/130 |
| 2009/0293074 A1 | 11/2009 | Rohwer |
| 2010/0030783 A1 | 2/2010 | Ho et al. |
| 2010/0099462 A1* | 4/2010 | Baek et al. .................. 455/566 |
| 2010/0131889 A1 | 5/2010 | Helmolt et al. |
| 2010/0145936 A1 | 6/2010 | Grinstein et al. |
| 2010/0251954 A1 | 10/2010 | Yamada |
| 2010/0318640 A1 | 12/2010 | Mehta et al. |
| 2010/0325582 A1 | 12/2010 | Bansal et al. |
| 2010/0333014 A1 | 12/2010 | Fritzley et al. |
| 2011/0072394 A1 | 3/2011 | Victor |
| 2011/0078016 A1 | 3/2011 | Wagenblatt et al. |
| 2011/0078058 A1 | 3/2011 | Wagenblatt et al. |
| 2011/0078171 A1 | 3/2011 | Wagenblatt et al. |
| 2011/0087708 A1 | 4/2011 | Teichmann et al. |
| 2011/0099500 A1 | 4/2011 | Smith et al. |
| 2011/0153629 A1* | 6/2011 | Lehmann et al. .................. 707/758 |
| 2011/0157005 A1 | 6/2011 | Inoue |
| 2011/0167369 A1 | 7/2011 | van Os |
| 2011/0167382 A1 | 7/2011 | van Os |
| 2011/0179368 A1 | 7/2011 | King et al. |
| 2011/0269435 A1 | 11/2011 | Dieckman |
| 2011/0276351 A1* | 11/2011 | Kondo et al. .................. 705/3 |
| 2011/0289422 A1 | 11/2011 | Spivack et al. |
| 2011/0298830 A1 | 12/2011 | Lam |
| 2012/0011426 A1 | 1/2012 | Yach |
| 2012/0032877 A1 | 2/2012 | Watkins, Jr. et al. |
| 2012/0036485 A1 | 2/2012 | Watkins, Jr. et al. |
| 2012/0079408 A1 | 3/2012 | Rohwer |
| 2012/0105484 A1 | 5/2012 | Cui |
| 2012/0117493 A1 | 5/2012 | Gu et al. |
| 2012/0131496 A1 | 5/2012 | Goossens et al. |
| 2012/0198369 A1 | 8/2012 | Sorin et al. |
| 2012/0253869 A1 | 10/2012 | Ansley |
| 2012/0284637 A1 | 11/2012 | Boyer et al. |
| 2012/0304121 A1 | 11/2012 | Cahill et al. |
| 2013/0038625 A1 | 2/2013 | Nakajima |
| 2013/0074003 A1* | 3/2013 | Dolenc .................. 715/784 |
| 2013/0085961 A1 | 4/2013 | Naghshin et al. |
| 2013/0144880 A1 | 6/2013 | Kemmer et al. |
| 2013/0290340 A1 | 10/2013 | Suermondt et al. |
| 2013/0321340 A1* | 12/2013 | Seo et al. .................. 345/174 |
| 2014/0036639 A1* | 2/2014 | Boni et al. .................. 368/29 |

FOREIGN PATENT DOCUMENTS

| | | |
|---|---|---|
| EP | 1837736 A2 | 9/2007 |
| EP | 2330470 A1 | 6/2011 |
| JP | 2009050937 A | 3/2009 |

OTHER PUBLICATIONS

Arsanjani, Ali, "Rule Object 2001: A Pattern Language for Adaptive and Scalable Business Rule Construction", IBM National EAD Center of Competency [online], [retrieved on May 16, 2014], Retrieved from the Internet (URL: http://citeseerx.ist.psu.edu/viewdoc/downioad?doi=10:1.1.202.6970&rep=rep1&type=pdf), 2001.

"Active Knowledge Modeling—Architect Your Business—12 Different Ways to Model Business Processes," http://activeknowledgemodeling.com/2009/03/31/12-different-ways-to-model-business-processes/, Mar. 31, 2009, 8 pages.

"Layer Container," http://homepage.mac.com/dlemmermann/DLSC/manual/components/layercontainer/layercontainer.html, 2007, 2 pages.

IBM TDB and Torres, R.J. "Zooming on Visual Calendar Data," IPCOM Prior Art Database, http://ip.com/IPCOM/000121803, Sep. 1, 1991, 2 pages.

Burigat et al., "Visualizing references to off-screen content on mobile devices: A comparison of Arrows, Wedge, and Overview + Detail," Interacting With Computers, 2011 Elsevier B.V., pp. 156-166.

Seavus Project Viewer 4.1, User Manual, 2009—Section 3.7 (groups) 3.6 (filters).

Google: "Android 2.3.4 User's Guide," googleusercontent.com, May 20, 2011, Retrieved on Oct. 10, 2013 from the Internet: URL:http://static.googleusercontent.com/external_conternt/untrusted_dlcp/www.google.com/en//help/hc/pdfs/mobile/AndroidUsersGuide-2.3.4.pdf.

* cited by examiner

METHOD AND DEVICE FOR DISPLAY TIME AND TIMESCALE RESET

BACKGROUND

The present invention relates to electronic calendar applications, and more particularly, to mobile electronic calendar applications that enable a user to reset the time and timescale illustrated by a calendar display.

Advances in computing technologies have enabled smaller devices, such as mobile phones and tablets, to execute more sophisticated applications. As a result, users are able to perform many of the functions on their mobile phones and tablets that they previously performed on their personal computers and laptops. For example, users are now able to view websites, e-mail, and calendars on their mobile phones and tablets.

A drawback of smaller devices is their reduced display size. In order to maximize the display size of these smaller devices, touch screen interfaces are often used. The use of a touch screen eliminates the need for a separate keypad such that additional space can be dedicated to a display. In addition, touch screens eliminate the need for a pointer object (e.g., arrow or cursor) within the display. Although touch screens help to maximize display size on mobile phones and tablets, their small displays still present challenges to application developers.

Calendar entries may include dense amounts of information. Such information is easier to view and comprehend when viewed on the larger screen sizes that are typically found on desktop monitors and laptops. The much smaller screens on mobile phones and tablets make it difficult for a user to quickly find, navigate, and comprehend the dense information that may be included in some calendar applications.

For example, when opening a calendar timeline interface, a user initially views an origination point in time (e.g., certain time and/or date) and may navigate in time from the origination point. There are several ways to go back to the origination point such as re-triggering the same search, re-opening the same element, or clicking on a "today" button if today's date is the origination point. Unfortunately, there is no method that allows a user to configure a pattern or sequence that will enable him to get back to the origination time position in the calendar.

Thus, there is a need for a more navigable mobile calendar application that easily allows a user to return to a time position (i.e., hour, day, week, month, and year).

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
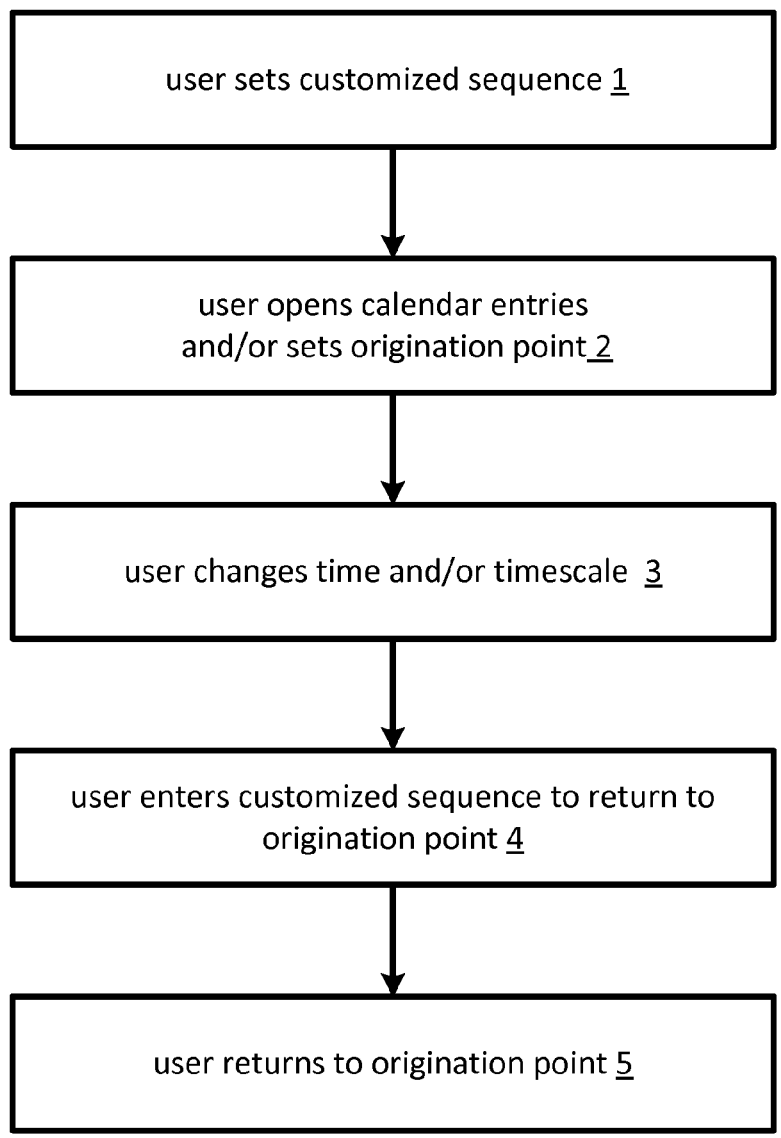
FIG. 1 illustrates a method for resetting the time and timescale illustrated by a calendar display according to an example embodiment of the present invention.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Embodiments of user interfaces and associated methods for using a device are described. In some embodiments, the device is a portable communication device (e.g., a mobile phone or tablet). The user interface may include a touch screen and/or other input/output devices. In the discussion that follows, a portable communications device is used as an example embodiment. It should be understood, however, that the user interfaces and associated methods may be applied to other devices, such as personal computers and laptops, that may include one or more other physical user-interface devices, such as a keyboard and or mouse.

The portable communication device may support a variety of applications, such as telephone, text messenger, and calendar applications. The various applications that may be executed on the device may use at least one common physical user-interface device, such as a touch screen. One or more functions of the touch screen as well as corresponding information displayed on the device may be adjusted and/or varied from one application to another and/or within a respective application. In this way, a common physical architecture of the device may support a variety of applications with user interfaces that are intuitive and transparent. In the discussion that follows, a calendar application is used as an exemplary embodiment, but it should be understood that the user interfaces and associated methods may be applied to other applications.

A calendar application that allows a user to quickly return to a time position and timescale is provided. In particular, a user may define a personalized pattern or sequence to reset the calendar time and timescale to a previously viewed time and timescale. A user-defined pattern, such as a motion on the touch screen or sequence on a keypad (or other tactile device), may then be applied to return to the original time position in a calendar application. Some examples include tapping 4 times on the touch screen or using any available sequence on a keypad and/or mouse (e.g., control key+mouse right click). In addition, the personalized pattern can be applied dynamically based on the user and business context interacting with the device.

A user viewing calendar content may vary the timescale. Using a user-interface of the portable communication device, a user may change the timescale. In the case of a touch screen, the timescale may be changed according to a change of a distance separating two user selected points on the screen as at least one of the user selected points is moved by the user. As the user zooms into and out of the timeline, a timescale that is displayed as part of the timeline may also be updated. For example, if a user zooms into a particular timescale showing several years worth of data in the timeline, the timescale may be updated to show fiscal quarters or calendar months instead of years. The entries that are shown in the timeline may also be updated so that they correspond to the selected zoomed in time period. A user using a touch screen device may use at least two of their fingers to select and/or move the two points on the touch screen.

In some instances, detailed information may be displayed for calendar entries when a user zooms into the timeline whereas aggregated, consolidated, or more general information may be displayed when the user zooms out of the timeline. In some instance, the degree of zooming may depend on the separation distance between the two user selected points as the user moves one of the points. As the separation distance changes, the calendar may be further zoomed into making it possible to zoom from displaying several years, to displaying only a few months, to only a few days, and so on by either spreading the two points further apart or moving them closer together. The reverse zoom may also be applied if the points are moved in the opposite direction by either moving them closer together or spreading them apart.

FIG. 1 illustrates a method for resetting the time and timescale illustrated by a calendar display according to an example embodiment of the present invention.

At step 1, a user may set a customized sequence that can be invoked in order to return to an origination point that includes a particular time and timescale of the calendar display. After being set, the customized sequence may be manually or dynamically applied based on the user and context.

The customized sequence may include a user-defined motion on the touch screen or a sequence on a keypad (or other tactile device). The calendar application may also include a preferences menu that enables a user to define customized sequences and the conditions when they may be applied. Of the numerous possible sequences, some examples include tapping 4 times on a touch screen or using any available sequence on a keypad and/or mouse (e.g., control key+ mouse right click). Alternatively, the calendar application may provide some pre-defined sequences that may also be applied by a user.

If desired, customized sequences may be applicable for certain types of calendar entries. For example, the customized sequence may only be invoked for "meeting" entries. In another alternative, the customized sequence may be applied between multiple applications. For example, if a user opens another application, such as e-mail, via the calendar, a customized sequence may be used to return to the calendar application. In yet another alternative, the customized sequence can enable a user also to return to an origination point which could be a point in any application (e.g., calendar or non-calendar). In this example, the origination point can be some context/point that is not a first time or timescale.

The step of setting one or more customized sequences may be performed initially when installing or first using the calendar application. Afterwards, a user may change the customized sequences as desired.

At step 2, a user opens the calendar application and/or sets an origination point. Once the calendar application is opened, the initially viewed time and timescale may be set as the origination point. Alternatively, a user may manually set an origination point at anytime. For example, an origination point may be set via a customized sequence or through a button of the calendar's user interface. In another example, an origination point may be set to today's date. In yet another example, the origination point may be the time and timescale viewed when the calendar is opened via another application such as e-mail.

Initially, the calendar application may require that a user provide a login name and login password to access the calendar. The login name and login password may then be used to identify individual users associated with a calendar. Optionally, the calendar application may be linked to an e-mail application such that calendar entries may also be added via the e-mail application.

Next, at step 3, a user navigates the calendar causing the time and timescale illustrated by a calendar display to change. Typically, a user opens the calendar application to view and/or modify (add, delete, change, etc.) one or more calendar entries of the electronic calendar. In addition, after opening the calendar application, a user may navigate the calendar and vary the timescale illustrated by the calendar application. For example, a user may desire to view several entries that are scattered in time. In the case of a touch screen, the time shown may be changed by sliding a point or finger across the timeline illustrated on the screen. Similarly, the timescale may be changed according to a change of a distance separating two user selected points on the screen as at least one of the user selected points is moved by the user. As the user zooms into and out of the timeline, a timescale that is displayed as part of the timeline may also be updated.

At step 4, a user applies a customized sequence to return to an origination point. In other words, a user enters the customized sequence on the touch screen, keypad or other input/output device. As discussed above, the customized sequence may be manually or dynamically applied based on the user and context.

Lastly, at step 5, the user is returned to the origination point. Here, the time and timescale of the origination point are displayed to the user. Thus, a calendar application that allows a user to easily return to a time position and timescale is provided.

Figure 2:
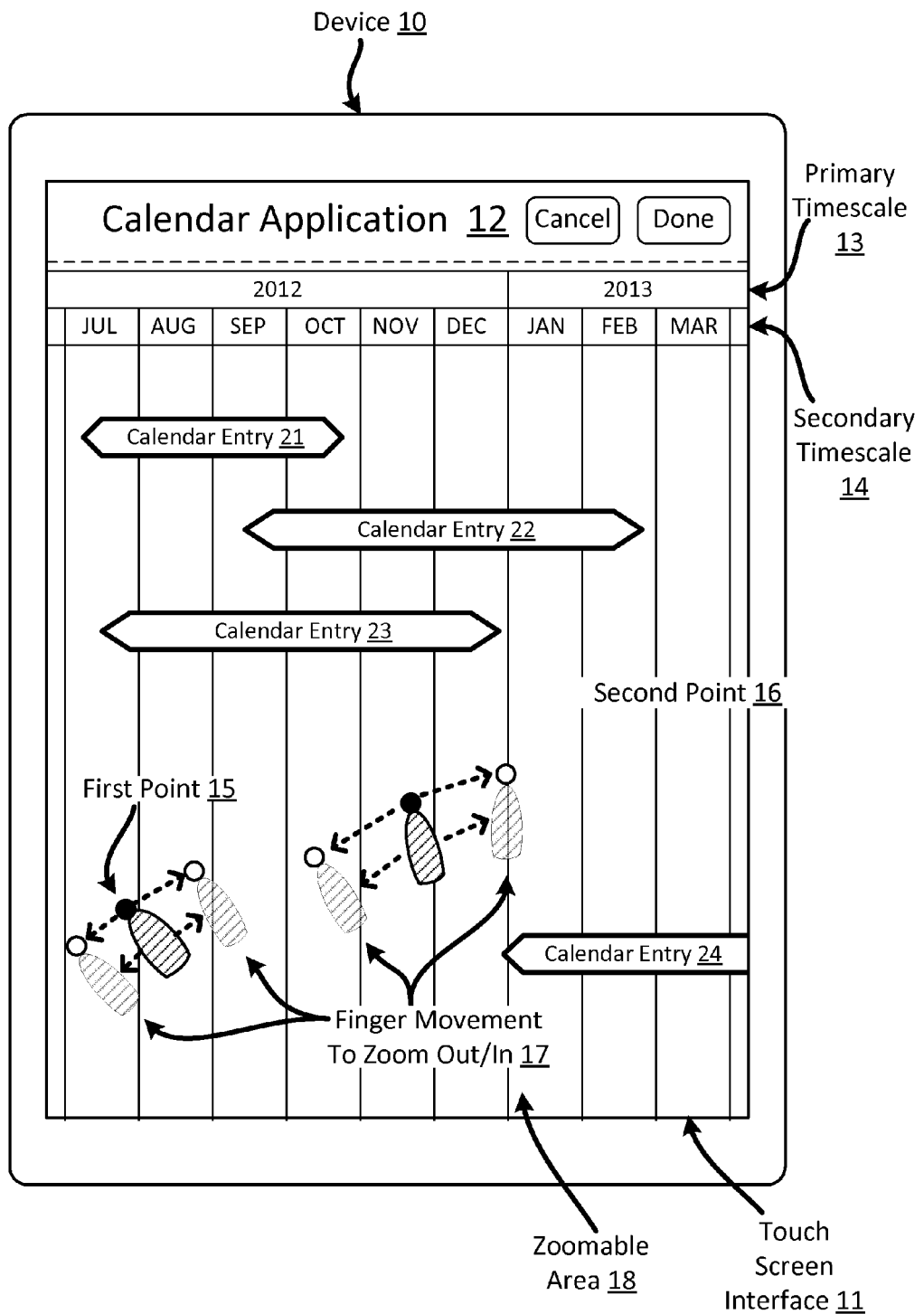
FIG. 2 illustrates a representative view of a portable electronic device having a calendar application according to an example embodiment of the present invention.

FIG. 2 illustrates a representative view of a portable electronic device having a calendar application according to an example embodiment of the present invention. As shown in FIG. 2, a portable electronic device 10 includes a touch screen interface 11 and calendar application 12 displayed thereon.

The calendar application 12 may show a horizontal timeline with a primary timescale 13 and a secondary timescale 14. The calendar application 12 may include a zoomable area 18 which may encompass the whole timeline or parts of the timeline where the user may use their fingers 17 or other objects to zoom in or out of the timeline. The calendar application 12 may also display calendar entries 21 to 24 that fall within the time periods displayed within the timeline.

A user may zoom in or out of the timeline by initially selecting first and second points 15 and 16 on the timeline with their fingers or another object. The user may then drag one or more of their fingers to change the distance between the first point 15 and the second point 16. The change in the distance separating the two points may determine whether to zoom in or out of the timeline and by what amount.

As discussed above, the setting of an origination point is triggered when the calendar application is opened. Alternatively, the origination point may be set manually, and may be applied dynamically based on user and context.

In some instances, whenever the timeline is readjusted, the calendar entries and/or other content associated with the timeline may also be reassessed for display in the timeline. In addition to changing the background image, the entries may be resized according to the zoom level and/or a different number of entries may be displayed to make the entries more readable and/or selectable by a user.

Figure 3:
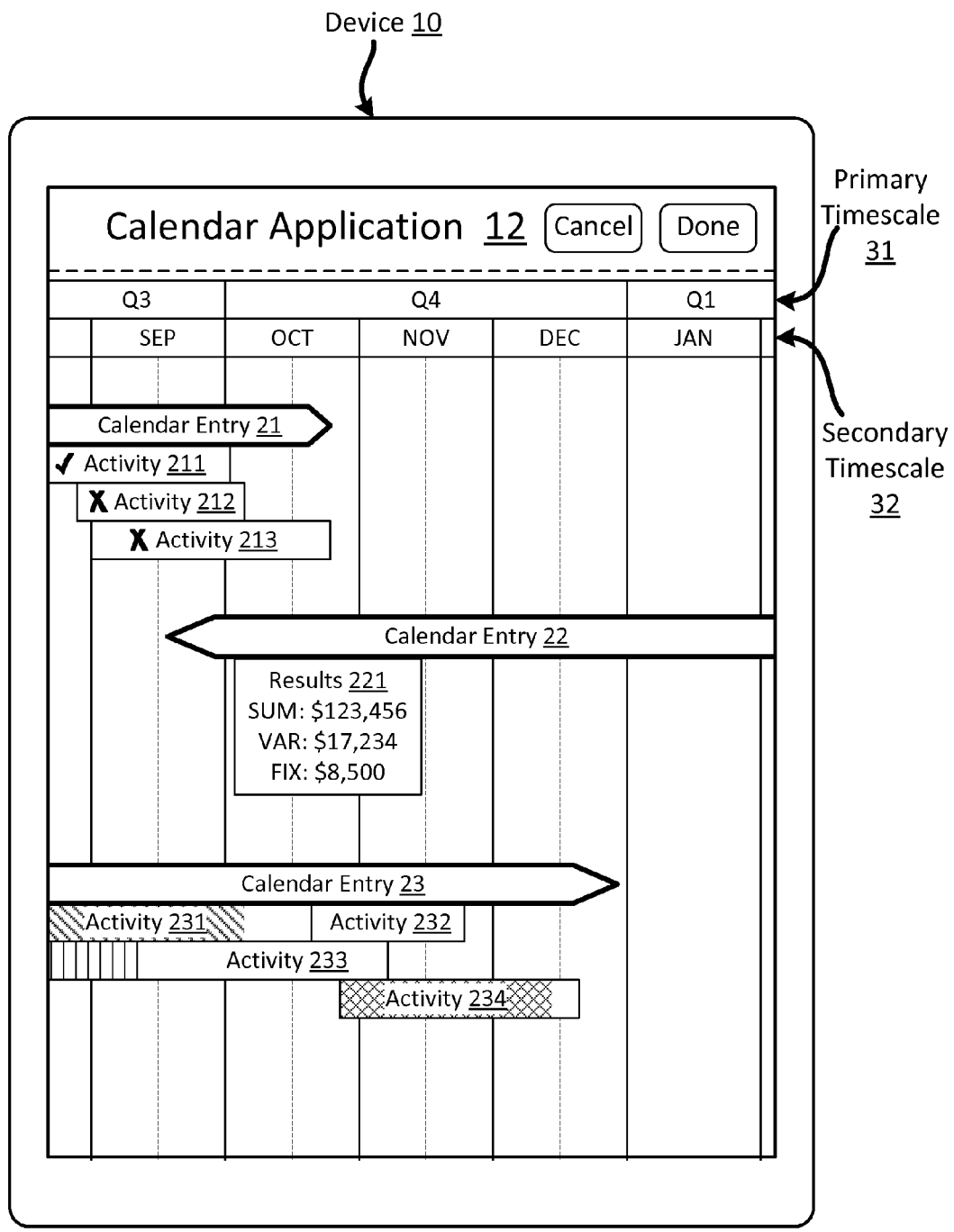
FIG. 3 illustrates another representative view of a portable electronic device having a calendar application according to an example embodiment of the present invention.

FIG. 3 illustrates another representative view of a portable electronic device having a calendar application according to an example embodiment of the present invention. As compared to FIG. 2, a shorter timeline is depicted in FIG. 3. In other words, FIG. 3 shows a zoomed in view of the calendar application of FIG. 2.

The zoomed in view may be generated in response to the user dragging at least one of the points in the FIG. 2 to zoom into the timeline. The view of FIG. 2 shows a timeline between July 2012 and March 2013, whereas the zoomed in view in FIG. 3 shows a timeline between September 2012 and January 2013.

When zooming into or out of the timeline, a timescale shown in the timeline displayed across a first dimension may be changed based on the adjusted start and end dates of the timeline. For example, in FIG. 2 the primary timescale 13 displays years, whereas the primary timescale 31 in FIG. 3 displays quarters (instead of years).

The timescale shown in the timeline may be a multidimensional timescale including a primary timescale 13 and 31 and a secondary timescale 14 and 32. The secondary timescale 14 and 32 may have a unit of time that is a subset of the primary timescale 13 and 31. When a multidimensional timescale is changed, at least one of the primary timescale 13 and 31 and the secondary timescale 14 and 32 may be changed accordingly. For example, the primary timescale 31 may be fiscal quarters and the secondary timescale 32 may be months. When zooming out of this calendar view, the primary timescale may change from fiscal quarters 31 to years 13, as shown when zooming out of FIG. 3 to return to the view of FIG. 2.

In some instances, the secondary timescale may be changed between different time units, such as from months to quarters. In other instances, the secondary timescale may continue to show the same time unit, such as months 14 and 32, though the space allocated for time unit may be changed, such as the space allocated for each month on the screen being reduced when zooming out from FIG. 3 to FIG. 2 and the space allocated being increased when zooming in from FIG. 2 to FIG. 3.

As discussed above, the origination point is based, in part, on timescale. Either or both of the primary timescale 13 and 31 and the secondary timescale 14 and 32 may be used in setting an origination point.

When zooming into or out of the calendar application 12, the information about one or more of the calendar entries displayed on the screen may also change. For example, in response to a user zooming into the timeline, additional information associated with each calendar entry may be displayed on the screen. This additional information may be displayed for those calendar entries that are within the adjusted start date and the adjusted end date of the timeline.

The additional information that is displayed may include any information about the activities, tasks, or events associated with a respective calendar entry. In some situations, the displayed additional information may include one or more sub-activity completion status bars 211 to 213. These status bars 211 to 213 may list one or more activities associated with a calendar entry 21 and show a status of the activity, for example, with a check mark or cross, so that a user can quickly identify a status of each activity. As the user further zooms into the calendar application 12, further information about each activity may be displayed, such as sub-activities status bars for each sub-activity associated with an activity. In some instances, the sub-activity status bars may be positioned in the calendar application 12 so that they are aligned with a start, end, or other date associated with the activity. A customized sequence may be used, for example, to return to a calendar entry view from an activity or sub-activity view.

In some situations, the displayed additional information may include statistical information 221 about a respective calendar entry. The statistical information 221 may, but need not, be limited to data included between the adjusted start date and the adjusted end date of the timeline as shown in the zoomed in timeline. The statistical information 221 may include a function, such as a sum, variance, or other function, that is applied to data associated with the calendar entry in order to generate the displayed statistical information 221. Also, the displayed information may include information obtained from a remote server, such as business warehouse (BW) figures including fixed rebates of $8,500 or miscellaneous rebates of $6,100. As the user further zooms into the calendar application 12, further details about the activity and/or the statistical information 221 may be displayed. A customized sequence may be used, for example, to return to a calendar entry view from an view in which statistical information is displayed.

In some situations, the displayed additional information may include one or more sub-activity progress bars 231 to 234. These progress bars 231 to 234 may be aligned in the calendar application with a start date and an end date of an activity associated with a respective calendar entry 23. A progress bar (shown in hatching) may show an overall completion amount of each activity. Progress bars of contingent activities 231 and 232 may be aligned on a same row. As the user further zooms into the calendar application 12, further details about the activity and/or the completion status of the progress bars 231 to 234 may be displayed. Again, a customized sequence may be used, for example, to return to a calendar entry view from an activity or sub-activity view.

Information displayed on screen may also be consolidated if the user zooms out of the calendar application 12. For example, in response to a user zooming out of the timeline, calendar entry information displayed on screen may be consolidated to display less information on the screen.

Figure 4:
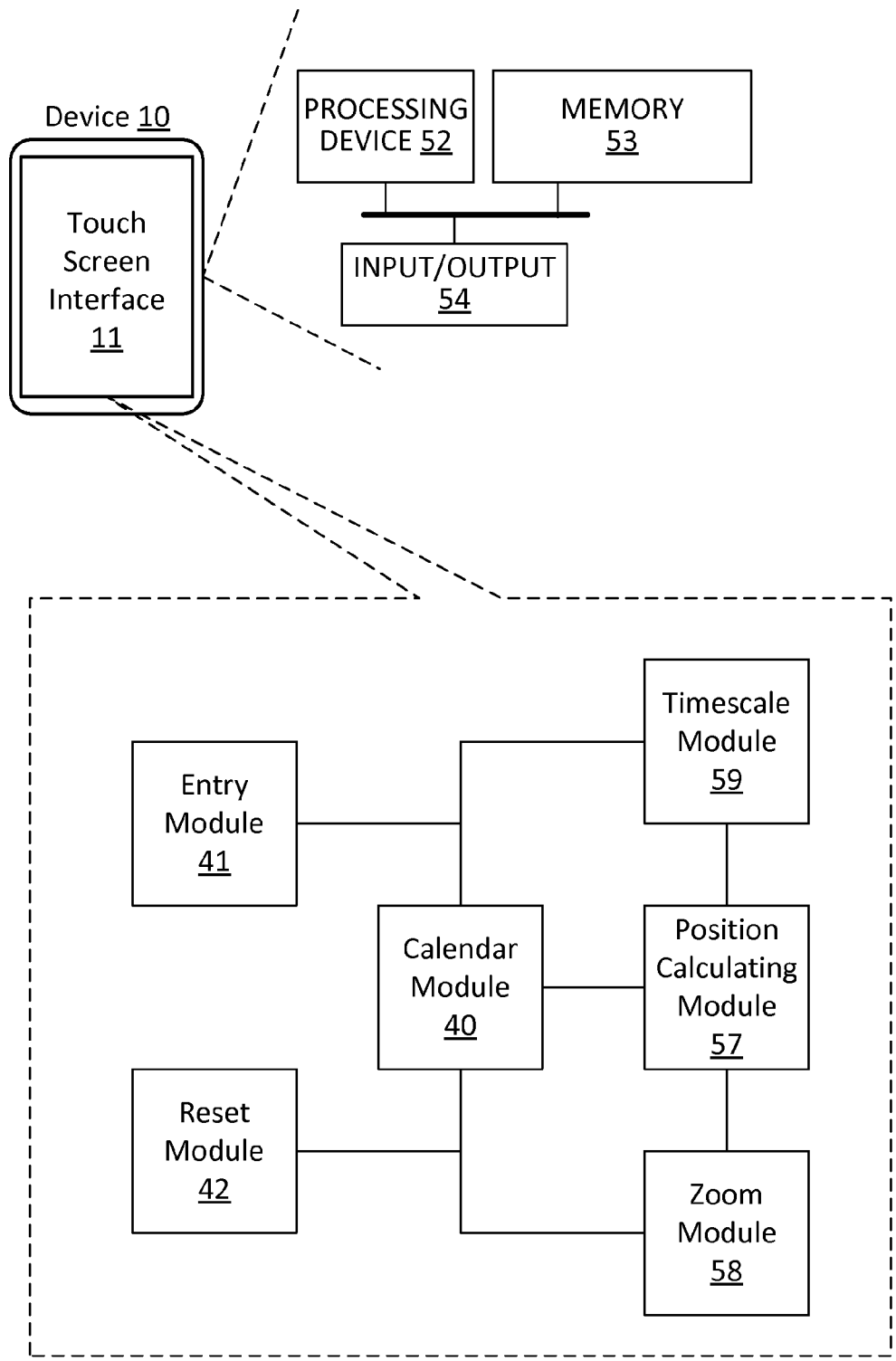
FIG. 4 illustrates a representative architecture of a portable electronic device according to an example embodiment of the present invention.

FIG. 4 illustrates a representative architecture of a portable electronic device according to an example embodiment of the present invention.

A portable electronic device 10 may include a touch screen interface 11, processing device 52, memory 53, and communications interface 54. The touch screen interface 11 may include a display, which may be a touch screen, capable of displaying data to a user of the portable electronic device 10.

Although not shown, the touch screen may include a sensor that may be a capacitive touch detection sensor, configured to detect and track movement on the surface and/or in the vicinity of the display. The sensor may be coupled to a signal processing circuit that is configured to identify, locate, and/or track object movement based on the data obtained from sensor.

Portable electronic device 10 may also include a calendar application module 40 that generally implements the functionality of an electronic calendar. Calendar application module 40 may be coupled to other modules including calendar entry module 41, reset module 42, position calculating module 57, zoom module 58, and a timescale module 59. Each of the modules may be part of the calendar application, or alternatively, may be part of another application and accessed by the calendar application. For example, the position calculating module 57 is coupled to zoom module 58, both of which may be shared by a variety of applications using the touch screen interface 11.

Memory 53 may include a computer readable medium storing application modules, which may include instructions associated with applications and modules of the portable electronic device 10.

The position calculation module 57 may include functionality for identifying a touched first point and second point within a calendar application displaying a timeline across a first dimension on the touch screen device 10. The position calculation module 57 may also include functionality for calculating a change in a distance between the first point and the second point in response to a dragging of at least one of the touched points, scaling the calculated change in distance with a scaling factor that varies for different units of time in the calendar application, and dividing the scaled calculated change in distance by the width of the displayed timeline and by an adjustment factor to calculate a date change amount.

The zoom module 58 may include functionality for identifying whether the dragging corresponds to a zooming in or a zooming out based on the calculated distance change. The zoom module 58 may also include functionality for adjusting a start date and an end date of the displayed timeline by the calculated date change amount according to whether the dragging is identified as corresponding to the zooming in or the zooming out.

The timescale module 59 may include functionality for changing a timescale shown in the timeline displayed across the first dimension based on the adjusting of the start date and the end date.

The reset module 42 can be used to store the origination point, customized sequences, and user preferences of the customized sequences. As discussed above, an origination point can be set manually or by launching the calendar application. Reset module 42 may also detect entry of a customized sequence by a user desiring to return to an origination point. Once a customized sequence is detected, reset module 42 directs calendar module 40 to return to the origination point.

The device 10 may contain a processing device 52, memory 53, and a communications device 54, all of which may be interconnected via a system bus. In various embodiments, the device 10 may have an architecture with modular hardware and/or software systems that include additional and/or different systems communicating through one or more networks via communications device 54.

Communications device 54 may enable connectivity between the processing devices 52 in the device 10 and other systems by encoding data to be sent from the processing device 52 to another system over a network and decoding data received from another system over the network for the processing device 52.

In an embodiment, memory 53 may contain different components for retrieving, presenting, changing, and saving data and may include computer readable media. Memory 53 may include a variety of memory devices, for example, Dynamic Random Access Memory (DRAM), Static RAM (SRAM), flash memory, cache memory, and other memory devices. Additionally, for example, memory 53 and processing device(s) 52 may be distributed across several different computers that collectively comprise a system. Memory 53 may be capable of storing user inputs and preferences as well as customized sequences.

In some instances, a cache in memory 53 may store calculated changes to the distance between the first point and the second point during the dragging of at least one of the points. The zoom module 58 may then adjust the start date and the end date of the calendar application only after a stored calculated change in the cache exceeds a threshold value.

Processing device 52 may perform computation and control functions of a system and comprises a suitable central processing unit (CPU). Processing device 52 may include a single integrated circuit, such as a microprocessing device, or may include any suitable number of integrated circuit devices and/or circuit boards working in cooperation to accomplish the functions of a processing device. Processing device 52 may execute computer programs, such as object-oriented computer programs, within memory 53.

The foregoing description has been presented for purposes of illustration and description. It is not exhaustive and does not limit embodiments of the invention to the precise forms disclosed. For example, although the processing device 52 is shown as separate from the modules 57 to 59 and the touch screen interface 11, in some instances the processing device 52 and the touch screen interface 11 and/or one or more of the modules 57 to 59 may be functionally integrated to perform their respective functions.

It will be apparent to those skilled in the art that various modifications and variations can be made in the method and device for time and timescale reset of the present invention without departing from the spirit or scope of the invention. Thus, it is intended that the present invention cover the modifications and variations of this invention provided they come within the scope of the appended claims and their equivalents.

We claim:

1. A method for navigating a calendar application, the method comprising:
   storing a sequence of user inputs associated with a first time and first timescale;
   viewing a second time and second timescale different from the first time and first timescale;
   detecting the sequence of user inputs by an input unit of a portable electronic device; and
   upon detection of the sequence of user inputs, returning to the first time and first timescale,
   wherein the first time and first timescale are set manually by a user.

2. The method according to claim 1, wherein the first time and first timescale are determined when the calendar application is launched.

3. The method according to claim 1, wherein the input unit is a touch screen.

4. The method according to claim 1, wherein the sequence of user inputs is detected in an application other than the calendar application.

5. The method according to claim 1, wherein the step of returning to the first time and first timescale is performed if the sequence of user inputs is detected when a specific type of calendar entry is being displayed by the calendar application.

6. The method according to claim 1, wherein the sequence of user inputs is defined by a user.

7. A portable electronic device comprising:
   a processor executing instructions for a calendar application and operable to display a calendar application at a first time and first timescale as well as a second time and second timescale different from the first time and first timescale;
   a memory operable to store a sequence of user inputs associated with a first time and first timescale; and
   an input unit operable to detect the sequence of user inputs;
   wherein the calendar application returns from the second time and second timescale to the first time and first timescale upon detection of the sequence of user inputs and wherein the first time and first timescale are set manually by a user.

8. The portable electronic device according to claim 7, wherein the first time and first timescale are determined when the calendar application is launched.

9. The portable electronic device according to claim 7, wherein the input unit is a touch screen.

10. The portable electronic device according to claim 7, wherein the sequence of user inputs is detected in an application other than the calendar application.

11. The portable electronic device according to claim 7, wherein the calendar application returns to the first time and first timescale if the sequence of user inputs is detected when a specific type of calendar entry is being displayed by the calendar application.

12. The portable electronic device according to claim 7, wherein the sequence of user inputs is defined by a user.

13. A non-transitory computer readable medium for navigating a calendar application, the computer readable medium:
    storing a sequence of user inputs associated with a first time and first timescale;
    viewing a second time and second timescale different from the first time and first timescale;
    detecting the sequence of user inputs by an input unit of a portable electronic device; and
    upon detection of the sequence of user inputs, returning to the first time and first timescale,
    wherein the first time and first timescale are set manually by a user.

14. The computer readable medium according to claim 13, wherein the first time and first timescale are determined when the calendar application is launched.

15. The computer readable medium according to claim 13, wherein the input unit is a touch screen.

16. The computer readable medium according to claim 13, wherein the sequence of user inputs is detected in an application other than the calendar application.

17. The computer readable medium according to claim 13, wherein the step of returning to the first time and first timescale is performed if the sequence of user inputs is detected when a specific type of calendar entry is being displayed by the calendar application.

18. The computer readable medium according to claim 13, wherein the sequence of user inputs is defined by a user.

19. A portable electronic device comprising:
    a processor executing instructions for a calendar application having a timescale module and operable to display a calendar application at a first time and first timescale as well as a second time and second timescale different from the first time and first timescale, each of the first and second timescales having primary and secondary sub-timescales, the secondary timescale being more granular than the primary timescale;
    a memory operable to store a sequence of user inputs associated with a first time and first timescale; and
    a touch screen unit operable to detect the sequence of user inputs, the touch screen unit being coupled to a position calculating module and zoom module,
    wherein the calendar application invokes a reset module to return from the second time and second timescale to the first time and first timescale upon detection of the sequence of user inputs and wherein the first time and first timescale are set manually by a user.

* * * * *